(12) United States Patent
Cheng et al.

(10) Patent No.: US 7,457,937 B1
(45) Date of Patent: Nov. 25, 2008

(54) METHOD AND SYSTEM FOR IMPLEMENTING LOW OVERHEAD MEMORY ACCESS IN TRANSPOSE OPERATIONS

(75) Inventors: Christopher T. Cheng, Santa Clara, CA (US); Stephen C. Purcell, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 315 days.

(21) Appl. No.: 11/351,652

(22) Filed: Feb. 9, 2006

Related U.S. Application Data

(60) Provisional application No. 60/651,830, filed on Feb. 9, 2005.

(51) Int. Cl.
*G06F 12/00* (2006.01)
(52) U.S. Cl. .......................................... 711/219; 711/5
(58) Field of Classification Search ...................... 711/5, 711/206, 207, 217, 218, 219
See application file for complete search history.

(56) References Cited

U.S. PATENT DOCUMENTS

| | | | |
|---|---|---|---|
| 4,799,149 A * | 1/1989 | Wolf ........................... | 711/108 |
| 5,177,704 A | 1/1993 | D'Luna | |
| 5,481,487 A | 1/1996 | Jang et al. | |
| 5,594,854 A | 1/1997 | Baldwin et al. | |
| 5,623,692 A | 4/1997 | Priem et al. | |
| 5,664,162 A | 9/1997 | Dye | |
| 5,854,637 A | 12/1998 | Sturges | |
| 5,911,144 A | 6/1999 | Schwartz et al. | |
| 5,915,255 A | 6/1999 | Schwartz et al. | |
| 5,920,876 A | 7/1999 | Ungar et al. | |
| 6,038,572 A | 3/2000 | Schwartz et al. | |
| 6,055,545 A | 4/2000 | Yazaki et al. | |
| 6,105,114 A * | 8/2000 | Okuno ....................... | 711/155 |
| 6,115,782 A | 9/2000 | Wolczko et al. | |
| 6,172,687 B1 * | 1/2001 | Kitamura et al. ............ | 345/564 |
| 6,188,394 B1 | 2/2001 | Morein et al. | |
| 6,249,853 B1 | 6/2001 | Porterfield | |
| 6,327,000 B1 | 12/2001 | Auld et al. | |
| 6,366,289 B1 | 4/2002 | Johns | |
| 6,833,835 B1 | 12/2004 | Van Vugt | |
| 7,158,148 B2 | 1/2007 | Toji et al. | |
| 2006/0010181 A1 | 1/2006 | Elftheriou et al. | |

* cited by examiner

*Primary Examiner*—Brian R Peugh

(57) ABSTRACT

Embodiments of the present invention recite a method and system for accessing data. In one embodiment of the present invention, a plurality of instances of data are stored in a memory device which comprises a plurality of memory modules disposed as an array of parallel columns. In response to receiving an indication that said plurality of instances of data is being accessed as a row of data, a first address translation table is accessed which describes the same row address in each of said plurality of memory modules wherein an instance of data is stored. Then, in response to receiving an indication that said plurality of instances of data is being accessed as a column of data, a second address translation table is accessed which describes a successive row address in each successive memory module wherein an instance of data is stored.

22 Claims, 9 Drawing Sheets

100

300    FIGURE 3
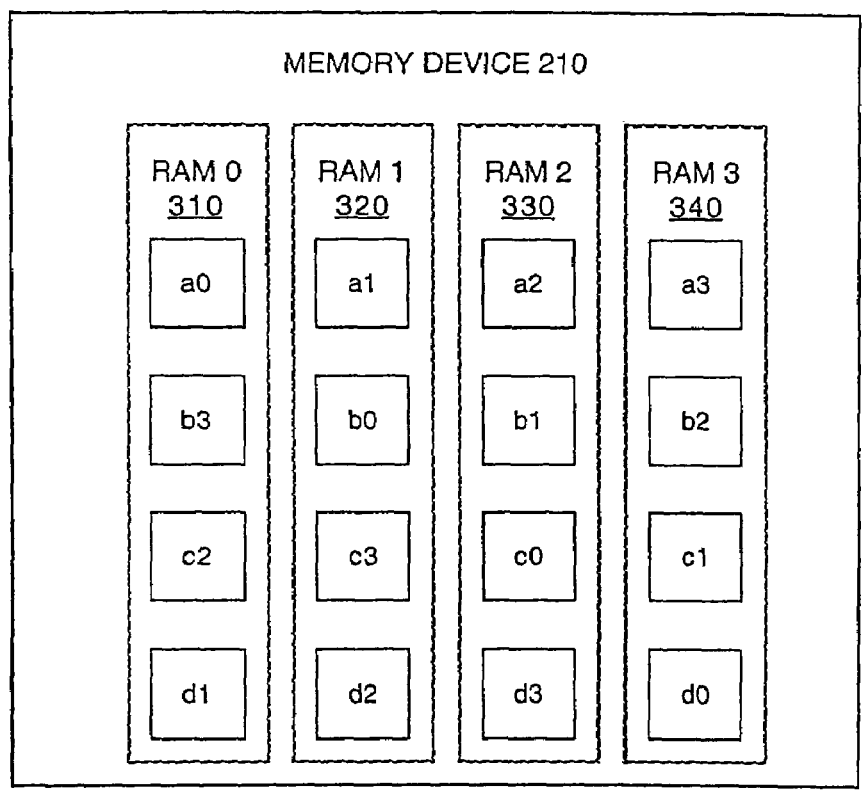

400  FIGURE 4A
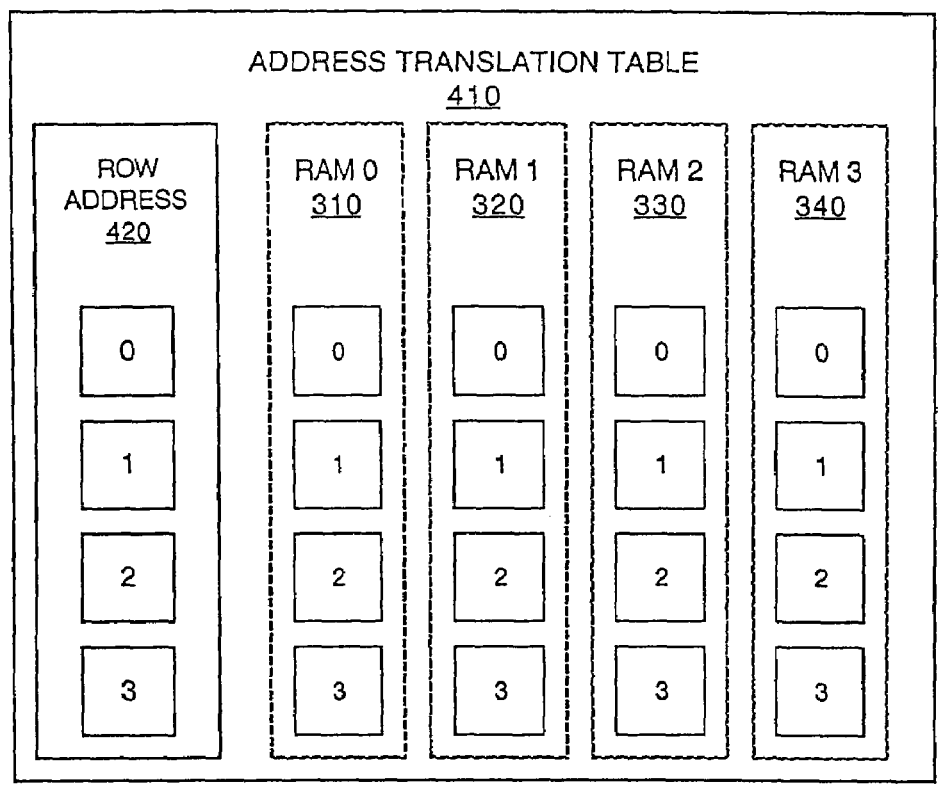

| COLUMN ADDRESS 460 | RAM 0 310 | RAM 1 320 | RAM 2 330 | RAM 3 340 |
|---|---|---|---|---|
| 0 | 0 | 1 | 2 | 3 |
| 1 | 3 | 0 | 1 | 2 |
| 2 | 2 | 3 | 0 | 1 |
| 3 | 1 | 2 | 3 | 0 |

ADDRESS TRANSLATION TABLE 450

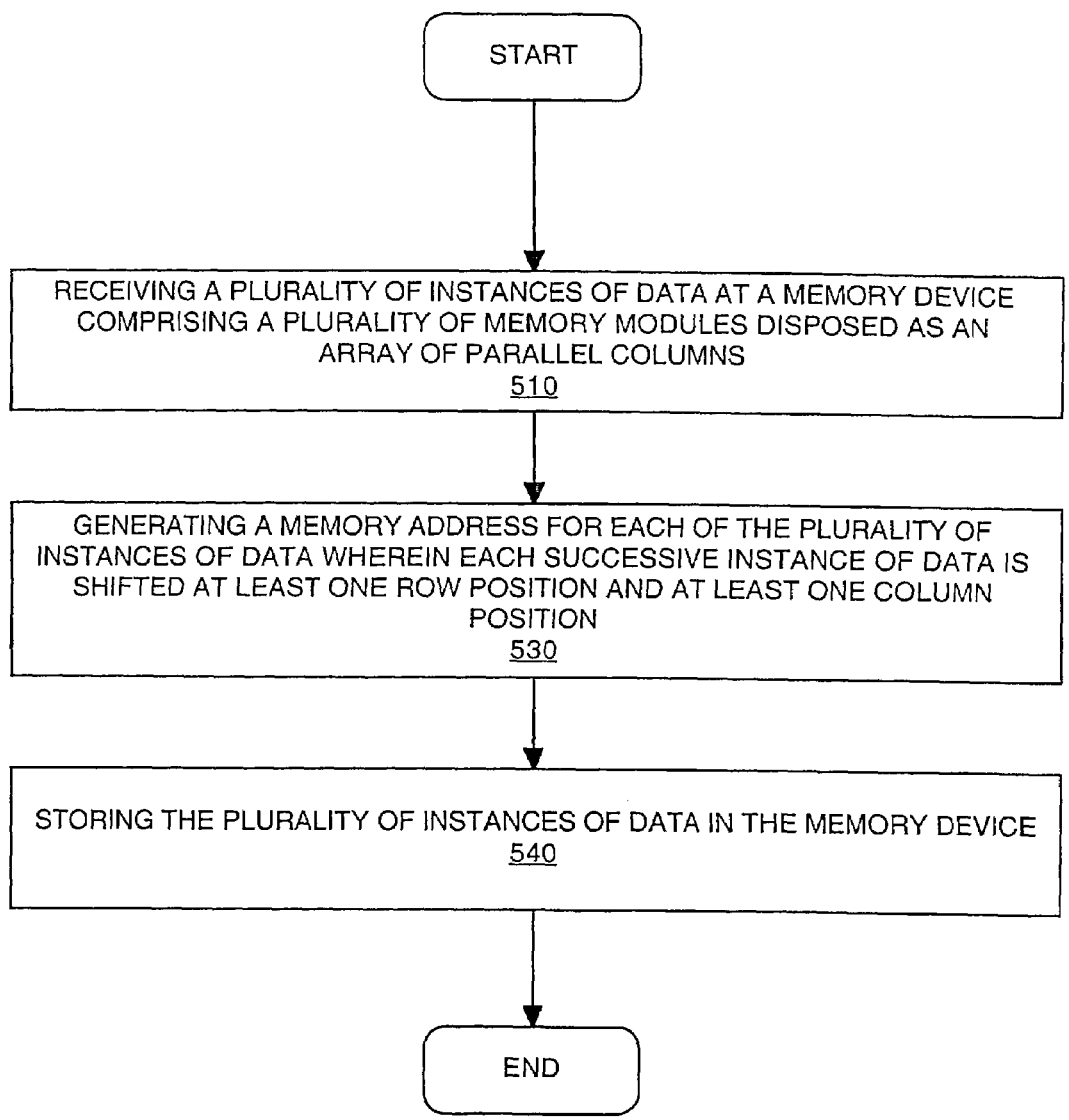

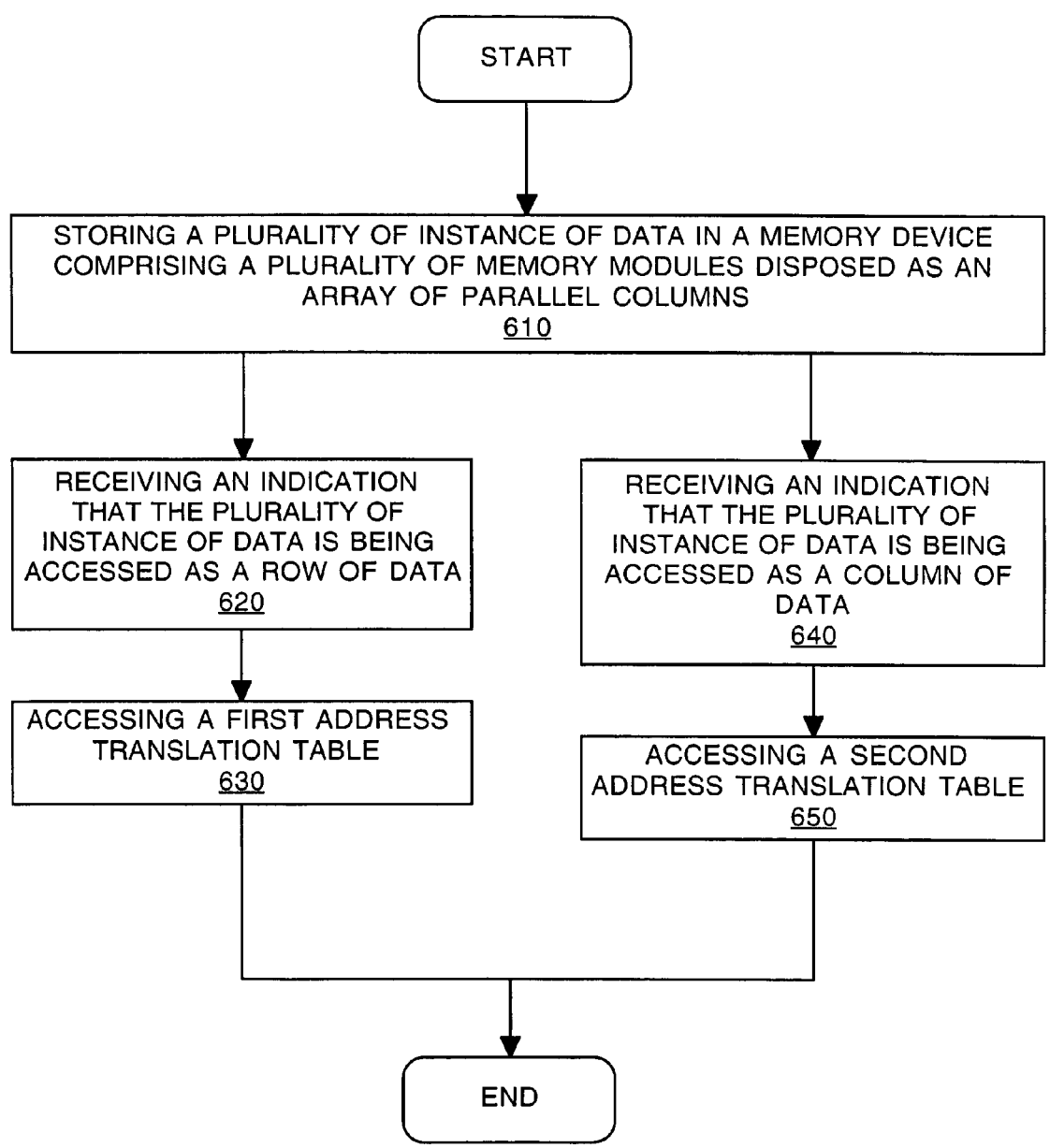

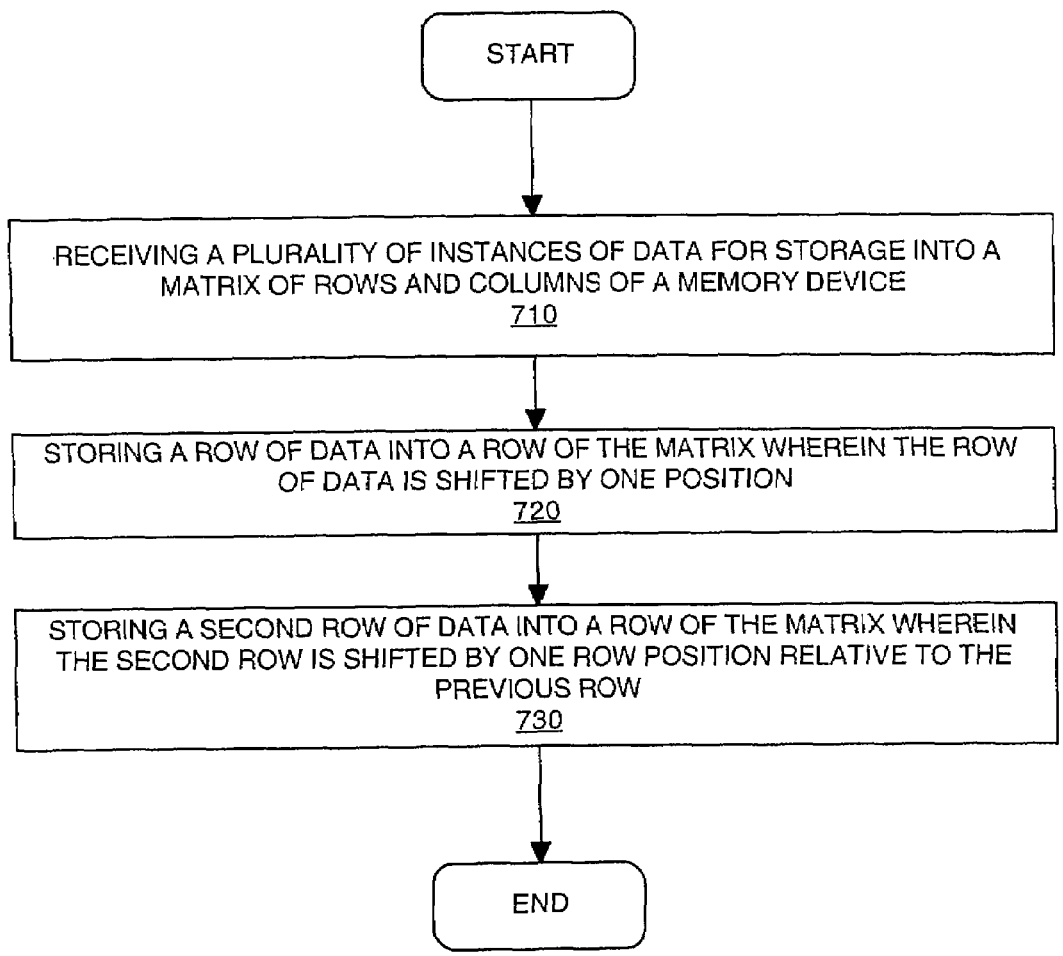

METHOD AND SYSTEM FOR IMPLEMENTING LOW OVERHEAD MEMORY ACCESS IN TRANSPOSE OPERATIONS

RELATED U.S. APPLICATION

This application claims priority to the co-pending Provisional Patent Application No. 60/651,830, entitled "METHOD AND SYSTEM FOR IMPLEMENTING LOW OVERHEAD MEMORY ACCESS IN TRANSPOSE OPERATIONS," by Cheng et al., with filing date Feb. 9, 2005, and assigned to the assignee of the present application.

FIELD OF THE INVENTION

Embodiments of the present invention relate to the field of computer memory devices.

BACKGROUND OF THE INVENTION

Computer memory devices typically arrange stored data in a two-dimensional matrix comprising rows and columns of data. For example, referring to FIG. 1, memory device 110 comprises a 4×4 matrix. In FIG. 1, rows of data are indicated by letters (e.g., a, b, c, and d) and columns of data are indicated by numbers (e.g., 0, 1, 2, and 3). To access a particular instance of data, an address translation table is accessed to determine the row and column locations of that particular instance of data (e.g., row b, column 1).

In many media processing applications (e.g., video processing), transpose operations are performed which necessitate accessing a two-dimensional array of data in both dimensions (e.g., horizontally and vertically). For example, an operation may be performed upon the rows of data, the result is stored in the memory device, and a second operation is performed upon the stored columns of data. However, memory devices and the processors which access them are not typically configured to access the data in two dimensions. In other words, the data can be easily accessed as rows of data, or columns of data. However, accessing the data as both rows and columns with equal efficiency is difficult to implement.

In one conventional solution to accessing the data in two dimensions, a scalar processor is used to access the data. As a result, each instance of data in a row or column of data is accessed sequentially. Thus, in the example of FIG. 1, to access row a, four sequential read operations are performed. However, to access column 1 of the data stored in memory device 110, each row of data must be read. Then, a filtering algorithm is used to select the instances of data which are wanted (e.g., a1, b1, c1, and d1). As a result, 16 read operations are performed to retrieve the 4 instances of data which are actually wanted. Then, the filtering algorithm selects the 4 instances of data which are wanted and discards the others. As a result, additional time is used to retrieve the unwanted data and to perform the filtering algorithm itself.

Another solution would be to use 4 ports (e.g., one per row, or one per column) to speed data retrieval. This is advantageous because each port could be used to read an instance of data from its respective column. However, additional ports consume excessive amounts of space on the memory device and, therefore, are not a viable alternative for most memory devices.

Another solution would be to access the data in parallel. However, most parallel architectures are forced to avoid algorithms which use both rows and columns and typically access the data in rows only.

Thus, conventional methods for accessing data in two dimensions cannot efficiently access the data as either a row or a column of data.

SUMMARY OF THE INVENTION

Accordingly, it would be advantageous to be able to access data stored in a memory device as a row of data or a column of data with equal efficiency. While meeting the above stated need, it would be advantageous to minimize the number of ports in the memory device to reduce the amount of physical space required on the memory device.

Embodiments of the present invention recite a method and system for accessing data. In one embodiment of the present invention, a plurality of instances of data are stored in a memory device which comprises a plurality of memory modules disposed as an array of parallel columns. In response to receiving an indication that the plurality of instances of data is being accessed as a row of data, a first address translation table is accessed which describes the same row address in each of the plurality of memory modules wherein an instance of data is stored. Then, in response to receiving an indication that the plurality of instances of data is being accessed as a column of data, a second address translation table is accessed which describes a successive row address in each successive memory module wherein an instance of data is stored.

In embodiments of the present invention, the instances of data stored in the memory device is disposed in an offset, or staggered, configuration. As a result, an instance of data from each data vector is stored upon each of the memory modules which comprise the memory device. Thus, to access a column of data, a row address in each of the memory modules is addressed. In embodiments of the present invention, each of the instances of data is offset based upon which row the instance of data is stored. As a result, a different row address is accessed in each of the memory modules being accessed. To access a row of data, the same row address in each of the memory modules is addressed. In embodiments of the present invention, the rows of data are successively offset based upon which row is being accessed.

In embodiments of the present invention, a first shifting component is used to shift each successive instance of data when a data vector is being stored. Because of the offset configuration of the stored data, a second shifting component is used to re-arrange the instances of data into a correct ordering when the data is being accessed as a row or column of data. Additionally, in embodiments of the present invention, an indication of whether the data is being accessed as a row or column causes an address generator to access a respective address translation table. Thus, if the data is being accessed as a row, a first address translation table is accessed and, if the data is being accessed as a column, a second address translation table is accessed. The address generator uses these address translation tables to control the first shifting component and the second shifting component.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 3 is a diagram showing an exemplary configuration of memory modules in accordance with embodiments of the present invention.

FIG. 4A shows an exemplary address table used in accordance with embodiments of the present invention.

FIG. 4B shows an exemplary address table used in accordance with embodiments of the present invention.

FIG. 5 is a flowchart of a method for implementing data storage in accordance with embodiments of the present invention.

FIG. 6 is a flowchart of a method of accessing data in accordance with embodiments of the present invention.

FIG. 7 is a flowchart of a method of accessing data in accordance with embodiments of the present invention.

DETAILED DESCRIPTION OF THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
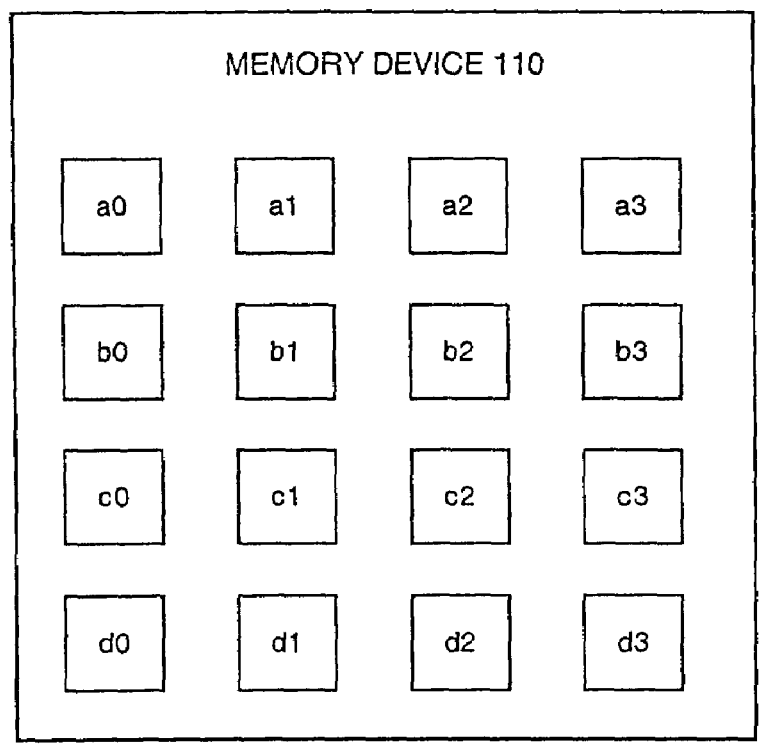
FIG. 1 is a diagram showing the configuration of an exemplary prior art memory device.
Figure 2:
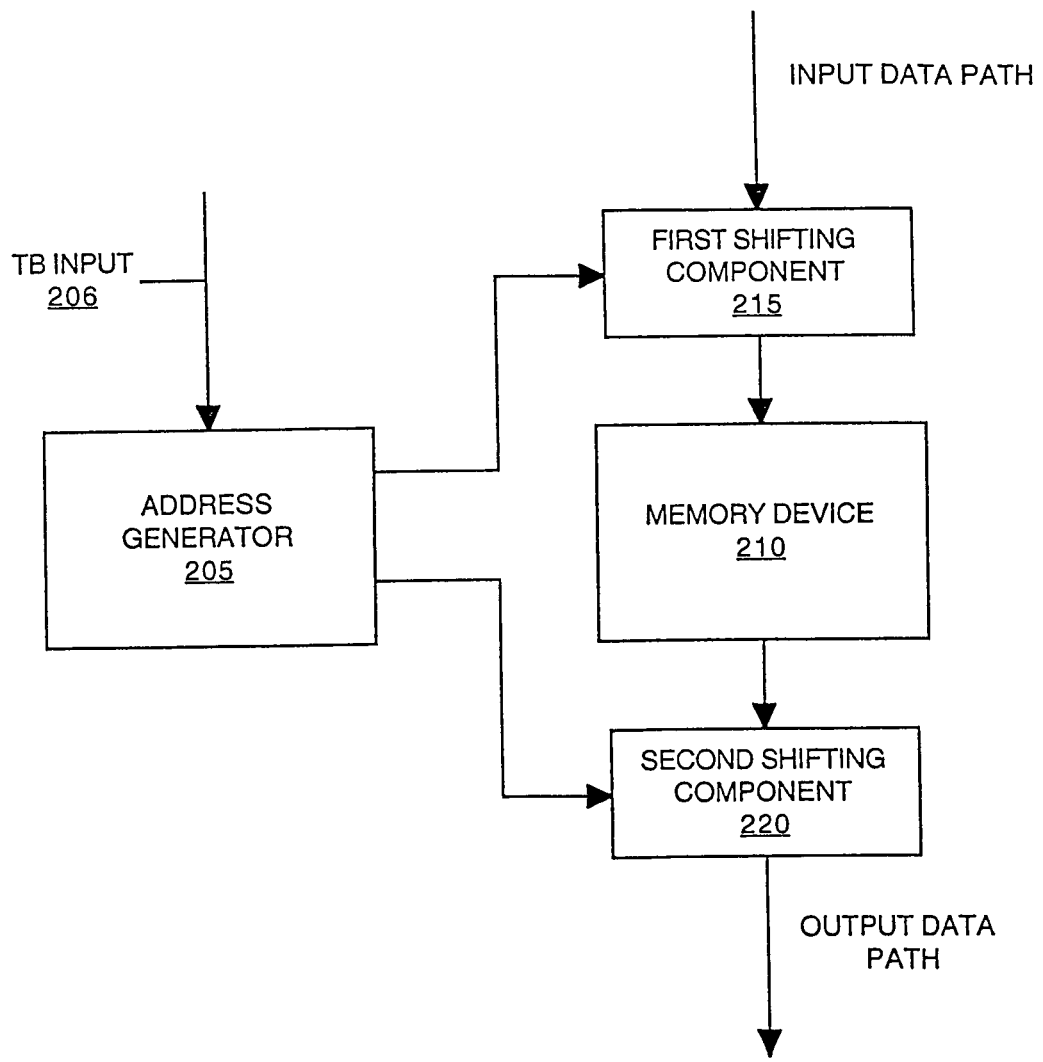
FIG. 2 shows an exemplary system for implementing low overhead memory access in transpose operations in accordance with embodiments of the present invention.

FIG. 2 shows an exemplary system for implementing low overhead memory access in transpose operations in accordance with embodiments of the present invention. In FIG. 2 an address generator 205 is communicatively coupled with a memory device 210. A first shifting component 215 is communicatively coupled in the input data path of memory device 210 and a second shifting component 220 is coupled in the output data path of memory device 210. In embodiments of the present invention, first shifting component 215 shifts instances of data to the right and second shifting component 220 shifts instances of data to the left in response to signals from address generator 205. In embodiments of the present invention, first shifting component 215 and second shifting component 220 are used to shift successive instances of data so that data can be stored and retrieved from in memory device 210 in a staggered manner.

FIG. 3 is a diagram showing the configuration of memory modules in memory device 210 in accordance with embodiments of the present invention. In FIG. 3, rows of data are indicated by letters (e.g., a, b, c, and d) and columns of data are indicated by numbers (e.g., 0, 1, 2, and 3). In embodiments of the present invention, memory device 210 is a single ported memory device comprising a plurality of memory modules (e.g., memory modules 310, 320, 330, and 340). In embodiments of the present invention, each of the memory modules comprising memory device 210 is a separately addressable random access memory (RAM). In FIG. 3, memory modules 310, 320, 330, and 340 are addressed as RAM 0, RAM 1, RAM 2, and RAM 3 respectively.

While embodiments of the present invention are described using four memory modules, it should be appreciated that the number of memory modules of memory device 210 is exemplary. Memory device 210 can include any number of powers of two memory modules (e.g., two, four, or eight memory modules). In one embodiment, memory device 210 includes sixteen memory modules.

In embodiments of the present invention, each of the memory modules comprising memory device 210 is a single width RAM comprising four instances of data. For example, RAM 0 can store instances of data which are addressed a0, b3, c2, and d1. In embodiments of the present invention, each instance of data may comprise a bit of data or multiple bits of data (e.g., a byte or a plurality of bytes of data). In embodiments of the present invention, memory modules 310, 320, 330, and 340 are disposed as an array of parallel columns. In FIG. 3, memory device 210 is configured to store four instances of data per row and four instances of data per column. However, it is appreciated that in other embodiments, memory device 210 may be configured to store a greater or lesser amount of data. For example, in one embodiment, memory device 210 may be configured with 16 memory modules, each of which is 16 bytes deep and 1 byte wide.

As shown in FIG. 3, memory device 210 stores data in a staggered manner wherein each successive instance of data is shifted at least one column position and at least one row position from the preceding instance of data. Thus, rather than storing all of the instances of data comprising column 0 in RAM 0, one instance of data of column 0 is stored in each of the memory modules comprising memory device 210. Thus, rather than storing all of column 0 in RAM 0 (e.g., memory module 310), each successive instance of data is shifted at least one column position to the right. The storage of data in a staggered manner is described in greater detail with reference to FIG. 5.

In embodiments of the present invention, when a data vector is first stored in memory device 210, first shifting component 215 shifts each successive instance of data one column position to the right. In other words, each instance of data is shifted one column position depending upon the row location of the instance of data. In FIG. 3, when data vector 0 (e.g., a0, b0, c0, and d0) is first stored in memory device 210, the instance of data in row 0 (e.g., a0) is shifted one column position to the right 0 times. The instance of data in row 1 (e.g., b0) is shifted one column position to the right 1 time, the instance of data in row 2 (e.g., c0) is shifted one column position to the right 2 times, and the instance of data in row 3 (e.g., d0) is shifted one column position to the right 3 times.

Storing the data in a staggered manner is advantageous because data can be more readily retrieved from memory device in two dimensions (e.g., as rows of data and as columns of data) than is possible using conventional data storage solutions. Additionally, by using a parallel array of single width memory modules, fewer operations are required to access the data.

In embodiments of the present invention, address generator 205 receives an indication via transpose bit (TB) input 206 which indicates whether data stored in memory device 210 is to be accessed as a row of data or as a column of data. For example, if the transpose bit is set to zero (0), the data stored in memory device 210 will be accessed as a row of data and if the transpose bit is set to one (1), the data stored in memory device 210 will be accessed as a column of data. In response to receiving the transpose bit, address generator 205 accesses a specific address translation table (e.g., address translation tables 410 and 450 of FIGS. 4A and 4B). Thus, if the transpose bit is set to 0, address translation table 410 is accessed and if the transpose bit is set to 1, address translation table 450 is accessed.

Additionally, address generator 205 controls shifting components 215 and 220. In embodiments of the present invention, when a data vector is first written to memory device 210, address generator 205 controls shifting component 215 so that each successive instance of data in the data vector is shifted at least one column position and at least one row position in memory device 210. For example, in one embodiment, first shifting component 215 shifts each successive instance of data to the right by one column.

Referring again to FIG. 2, in response to the indication received via TB input 206, address generator 205 accesses a first address translation table (e.g., 410 of FIG. 4A), or a second address translation table (e.g., 450 of FIG. 4B) which is then used to control the amount of shifting performed by first shifting component 215 and/or second shifting component 220.

FIG. 4A shows an exemplary address table 410 used in accordance with embodiments of the present invention. Address table 410 is used when the transpose bit indicates that data stored in memory device 210 is to be accessed as a row of data. The following discussion will also refer to FIG. 3 to show how data is accessed in accordance with embodiments of the present invention.

If an operation requires accessing row of data, address generator 205 accesses address translation table 410. Row address column 420 is first traversed until the correct row address (e.g., row 0) is reached. Address generator 205 then reads the row addresses corresponding to row 0 which indicate which row address in each of the memory modules should be accessed. For example, to access row 0, each of memory modules 310, 320, 330, and 340 accesses the instance of data in row position 0. Because only one RAM can be read per cycle, starting with RAM 0, the data will be read in the sequence a0, a1, a2, and a3. Because this is the correct data sequence, there is no need to shift the data. Accordingly, address generator 205 sends a signal to first shifting component 215 to shift each of the instances of data to the right 0 times when row 0 is being written into memory device 210. Similarly, when row 0 is being read, address generator 205 sends a signal to second shifting component 220 to rotate each of the instances of data to the left 0 times.

When row 1 is being accessed, each instance of data is shifted one column position. For example, to write to row 1, address generator 205 sends a signal to first shifting component 215 to rotate each instance of data to the right 1 time. When data is being read from row 1, because only one RAM can be read per cycle starting with RAM 0, the data will be read in the sequence b3, b0, b1, and b2. However, this is the wrong sequence and therefore address generator 205 sends a signal to second shifting component 220 to shift each instance of data to the left 1 time when row 1 is being read. As a result, when the data is output from second shifting component 220, the data sequence is b0, b1, b2, and b3. Thus, in embodiments of the present invention, the instances of data are rotated back based upon which row (e.g., row 0) of data is being accessed.

FIG. 4B shows an exemplary address table 450 used in accordance with embodiments of the present invention. In embodiments of the present invention, address generator 205 accesses address translation table 450 when the transpose bit indicates that data stored in memory device 210 is to be accessed as a column of data. For example, if column 0 is being accessed, address generator 205 traverses column address column 460 until the correct column address is reached. Address generator 205 then reads the row positions which are listed horizontally in address translation table 450 which correspond to that column of data.

In FIG. 4B, address translation table 450 indicates that to access column 0, the instance of data stored in row position 0 of RAM 0 (e.g., memory module 310) is to be accessed. In RAM 1 (e.g., memory module 320) the instance of data stored in row position 1 is to be accessed. In RAM 2 (e.g., memory module 330), the instance of data stored in row position 2 is to be accessed and in RAM 3 (e.g., memory module 340), the instance of data stored in row position 3 is to be accessed. Because only one RAM can be read per cycle, starting with RAM 0, the data will be read in the sequence a0, b0, c0, and d0. Because this is the correct data sequence, there is no need to shift the instances of data when they are output from second shifting component 220.

If column 1 is being accessed, address generator 205 traverses column address column 460 until the correct column address is reached. Address generator 205 then reads the row positions which are listed horizontally in address translation table 450 which correspond to that column of data.

In FIG. 4B, address translation table 450 indicates that to access column 1, the instance of data stored in row position 3 of RAM 0 (e.g., memory module 310) is to be accessed. In RAM 1 (e.g., memory module 320) the instance of data stored in row position 0 is to be accessed. In RAM 2 (e.g., memory module 330), the instance of data stored in row position 1 is to be accessed and in RAM 3 (e.g., memory module 340), the instance of data stored in row position 2 is to be accessed. Because only one RAM can be read per cycle, starting with RAM 0, the data will be read in the sequence d1, a1, b1, and c1. Because this is not the correct data sequence, the sequence of the instances of data will be rotated prior to being output from second shifting component 220. In embodiments of the present invention, when a column of data is being accessed, the position of each successive instance of data is rotated based upon the row position of the instance of data being accessed. Thus, when accessing column 1, RAM 0 accesses row position 3 to access the instance of data (e.g., d1 of FIG. 3). Thus, address generator 205 sends a signal to second shifting component 220 to rotate that instance of data 3 times to the left. Because RAM 1 accesses row position 0 to access the instance of data (e.g., a1 of FIG. 3), address generator 205 sends a signal to second shifting component 220 to rotate that instance of data 0 times to the left. Similarly, because RAM 2 accesses row position 1 (e.g., b1 of FIG. 3), address generator 205 sends a signal to second shifting component 220 to rotate that instance of data 1 time to the left. Finally, because RAM 3 accesses row position 2 to access the instance of data (e.g., c1 of FIG. 3), address generator 205 sends a signal to second shifting component 220 to rotate that instance of data 2 times to the left.

When a column of data is being accessed, each of memory modules 310, 320, 330, and 340 receives a 2 bit address which causes them to access an instance of data which is shifted at least one column position from the preceding instance of data. For example, to access column 0, RAM 0 receives a row address of 00 which causes RAM 0 to access the instance of data (e.g., memory location a0 of FIG. 3). RAM 1 receives an address of 01, which causes it to access the instance of data stored in memory location b0 of FIG. 3. RAM 2 receives an address of 10, which causes it to access the instance of data stored in memory location c0 of FIG. 3 and RAM 3 receives an address of 11 which causes it to access the instance of data stored in memory location d0 of FIG. 3.

FIG. 5 is a flowchart of a method 500 for implementing data storage in accordance with embodiments of the present invention. In step 510 of FIG. 5, a plurality of instances of data is received at a memory device comprising a plurality of memory modules which are disposed as an array of parallel columns. As discussed above with reference to FIGS. 2 and 3, in embodiments of the present invention memory device 210 is comprised of a plurality of memory modules (e.g., memory modules 310, 320, 330, and 340 of FIG. 3) which are disposed as an array of parallel columns.

In step 520 of FIG. 5, a memory address is generated for each of the plurality of instances of data. When a data vector is first stored in memory device 210, address generator 205 generates a memory address for each of the instances of data comprising the data vector. In embodiments of the present invention, the memory addresses for each of the successive instances of data are successively shifted by at least one column position and at least one row position.

In step 530 of FIG. 5, the plurality of instances of data is stored in the memory device. In embodiments of the present invention, address generator 205 controls first shifting component 215 to successively shift instances of data in the data vector being stored such that each successive instance of data is shifted by at least one column position and at least one row position.

FIG. 6 is a flowchart of a method 600 of accessing data in accordance with embodiments of the present invention. In step 610 of FIG. 6, a plurality of instances of data are stored in a plurality of memory modules disposed as an array of parallel columns. As discussed above with reference to FIGS. 2 and 3, address generator 205 generates a memory address for each instance of data that is stored in memory device 210. In embodiments of the present invention, memory device is comprised of a plurality of memory modules (e.g., memory modules 310, 320, 330, and 340 of FIG. 3) which are disposed as an array of parallel columns. It should be appreciated that steps 620 and 630 can be performed in parallel with steps 640 and 650. In one embodiment, either steps 620 and 630 are performed or steps 640 and 650 are performed.

In step 620 of FIG. 6, an indication is received that the plurality of instances of data is being accessed as a row of data. In embodiments of the present invention, a transpose bit is received by address generator 205 via transpose bit (TB) input 206 which indicates that data stored in memory device 210 is being accessed as a row of data.

In step 630 of FIG. 6, a first address table is accessed. In response to the transpose bit indicating that the data stored in memory device is being accessed as a row of data, address generator 205 accesses address translation table 410 to determine the row addresses and column addresses of the instance of data being accessed.

In step 640 of FIG. 6, an indication is received that the plurality of instances of data is being accessed as a column of data. In embodiments of the present invention, a transpose bit is received by address generator 205 via transpose bit (TB) input 206 which indicates that data stored in memory device 210 is being accessed as a column of data.

In step 650 of FIG. 6, a second address translation table is accessed. In response to receiving the transpose bit of step 640, address generator 205 accesses address translation table 450 to determine the row addresses and column addresses of the instances of data being accessed.

FIG. 7 is a flowchart of a method 700 of accessing data in accordance with embodiments of the present invention. In step 710 of FIG. 7, a plurality of instances of data are received for storage into a matrix of rows and columns of a memory device. As discussed above with reference to FIGS. 2 and 3, in embodiments of the present invention, memory device 210 is a single ported memory device comprising a plurality of memory modules (e.g., 310, 320, 330, and 340 of FIG. 3) which are disposed as an array of parallel columns.

In step 720 of FIG. 7, a row of data is stored into a row of the matrix wherein the row of data is shifted by one position. In embodiments of the present invention, when a row of data is stored in a row "i" of memory device 210 (e.g., row address 1 of FIG. 4A), the row of data is shifted one column position relative to an $(i-1)^{th}$ row of the matrix (e.g., row address 0 of FIG. 4A). Referring again to FIG. 3, when row address 1 is written into memory device 210, the first instance of data (e.g., b0 of FIG. 3) is shifted by one column position relative to the first instance of data in row address 0 (e.g., a0 of FIG. 3).

In step 730 of FIG. 7, a second row of data is stored into a row of the matrix wherein the second row is shifted by one row position relative to the previous row. In embodiments of the present invention, when another row of data is stored in row (i+1) of memory device 210 (e.g., row address 2 of FIG. 4A), the new row of data is shifted one column position relative to row "i" of the matrix (e.g., row address 1 of FIG. 4A). Referring again to FIG. 3, when row address 2 is written into memory device 210, the first instance of data (e.g., c0 of FIG. 3) is shifted by one column position relative to the first instance of data in row address 1 (e.g., a0 of FIG. 3).

As a result, data stored in memory device 210 can be read more easily both as columns of data and as rows of data. In embodiments of the present invention, the same number of cycles is used when accessing the data in memory device 210 as a row of data as when accessing the data in memory device 210 as a column of data.

Figure 8:
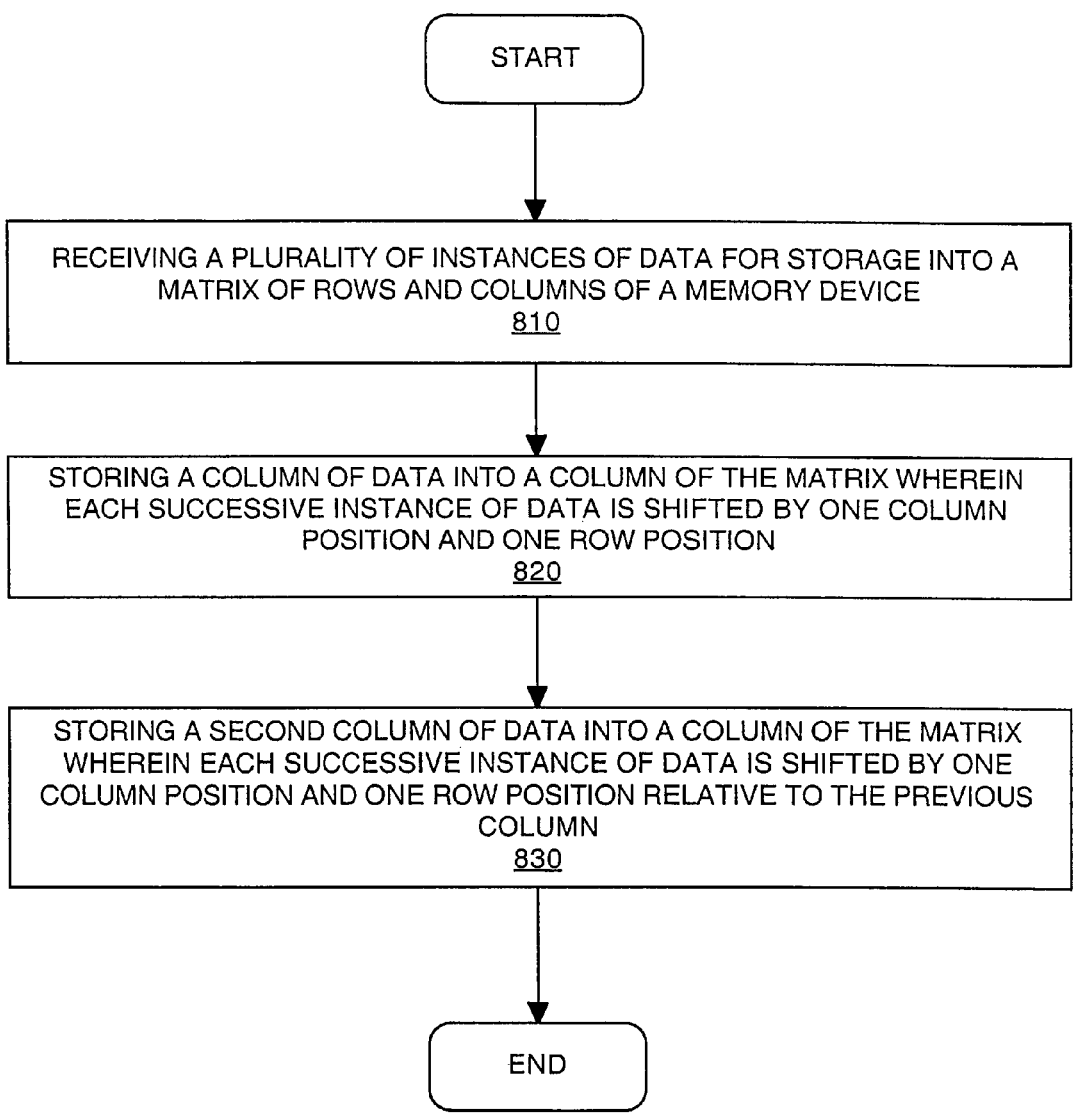
FIG. 8 is a flowchart of a method of accessing data in accordance with embodiments of the present invention.

FIG. 8 is a flowchart of a method 800 of accessing data in accordance with embodiments of the present invention. In step 810 of FIG. 8, a plurality of instances of data are received for storage into a matrix of rows and columns of a memory device. As discussed above with reference to FIGS. 2 and 3, in embodiments of the present invention, memory device 210 is a single ported memory device comprising a plurality of memory modules (e.g., 310, 320, 330, and 340 of FIG. 3) which are disposed as an array of parallel columns.

In step 820 of FIG. 8, a column of data is stored into a column of the matrix wherein each successive instance of data is shifted by one column position and one row position. In embodiments of the present invention, when a column of data is stored in a column "i" of memory device 210 (e.g., column address 1 of FIG. 4B), each instance of data in the column of data is shifted by one column position relative to an $(i-1)^{th}$ column of the matrix (e.g., column address 0 of FIG. 4A) and by one row position relative to the $(i-1)^{th}$ column of the matrix. Referring again to FIG. 3, when column address 1 is written into memory device 210, the first instance of data (e.g., b0 of FIG. 3) is shifted by one column position and by one row position relative to the first instance of data in column address 0 (e.g., a0 of FIG. 3).

In step 830 of FIG. 8, a second column of data is stored into a column of the matrix wherein each successive instance of data is shifted by one column position and one row position relative to the previous column. In embodiments of the present invention, when a second column of data is stored in a column (i+1) of memory device 210 (e.g., column address 2 of FIG. 4B), each instance of data in the column of data is shifted by one column position relative to column "i" of the matrix (e.g., column address 1 of FIG. 4A) and by one row position relative to the $(i-1)^{th}$ column of the matrix. Referring again to FIG. 3, when column address 2 is written into memory device 210, the first instance of data (e.g., c0 of FIG.

3) is shifted by one column position and by one row position relative to the first instance of data in column address 1 (e.g., b0 of FIG. 3). In other words, when a successive column of data is written into memory device 210, it is offset by one column position and by one row position from the preceding column of data.

Various embodiments of the present invention, a method and system for implementing low overhead memory access in transpose operations, are thus described. While the present invention has been described in particular embodiments, it should be appreciated that the present invention should not be construed as limited by such embodiments, but rather construed according to the following claims.

What is claimed is:

1. A method for data storage comprising:
receiving a plurality of instances of data at a memory device, said memory device comprising a plurality of memory modules which are disposed as an array of parallel columns;
generating a memory address for each of said plurality of instances of data wherein each successive instance of data is shifted at least one column position and at least one row position in said memory device; and
storing said plurality of instances of data in said memory device.

2. The method as recited in claim 1 wherein said memory device comprises a single port memory device.

3. The method as recited in claim 1 further comprising:
receiving an indication that said plurality of instances of data is being accessed as a row of data; and
accessing a first address translation table which describes the same row address in each of said plurality of memory modules.

4. The method as recited in claim 3 further comprising:
receiving an indication that said plurality of instances of data is being accessed as a column of data; and
accessing a second address translation table which describes a successive row address in each successive memory module.

5. The method as recited in claim 1 further comprising:
storing a row of data in said memory device; and
shifting each successive instance of data being stored in said memory device by at least one column position based upon which row of said memory device said instance of data is stored.

6. The method as recited in claim 5 further comprising:
reading a row of data from said memory device; and
shifting the position of each successive instance of data being read by at least one column position based upon which row of said memory device said instance of data is stored.

7. The method as recited in claim 1 further comprising:
storing a column of data in said memory device; and
shifting each successive instance of data to a successive memory module in said memory device based upon which row of said memory device said instance of data is stored.

8. The method as recited in claim 7 further comprising:
reading a row of data from said memory device; and
shifting the position of each successive instance of data being read based upon which row of said memory device said instance of data is stored.

9. The method as recited in claim 1 further comprising:
accessing said plurality of instances of data and wherein the same number of cycles is used when accessing said plurality of instances of data as a row of data as when accessing said plurality of instances of data as a column of data.

10. A method for accessing data comprising:
storing a plurality of instances of data in a memory device, said memory device comprising a plurality of memory modules which are disposed as an array of parallel columns;
receiving an indication that said plurality of instances of data is being accessed as a row of data;
accessing a first address translation table which describes same row address in each of said plurality of memory modules wherein an instance of data of said plurality of instances of data is stored;
receiving an indication that said plurality of instances of data is being accessed as a column of data; and
accessing a second address translation table which describes a successive row address in each successive memory module wherein an instance of data of said plurality of instances of data is stored.

11. The method as recited in claim 10 wherein said memory device is a single ported memory device.

12. The method as recited in claim 10 further comprising:
storing said plurality of instances of data in said memory device wherein each successive instance of data is shifted at least one column position and at least one row position in said memory device.

13. The method as recited in claim 12 further comprising:
storing said plurality of instances of data as a row of data; and
shifting each successive instance of data in said data vector by at least one column position based upon the row of said memory device at which said instances of data are being stored.

14. The method as recited in claim 13 further comprising:
reading said row of data wherein each of said plurality of memory modules is separately addressed; and
shifting the position of each successive instance of data being read by at least one column position based upon which row of said memory device is being read.

15. The method as recited in claim 12 further comprising:
storing said plurality of instances of data as a column of data; and
shifting each successive instance of data in said data vector by at least one column position based upon the row of said memory device to which said instance of data is being stored.

16. The method as recited in claim 15 further comprising:
reading said plurality of instances of data wherein each of said plurality of memory modules is separately addressed; and
shifting the position of each successive instance of data being read by at least one column position based upon which row of said memory device is being read.

17. The method as recited in claim 10 wherein the same number of cycles is used when accessing said plurality of instances of data as a row of data as when accessing said plurality of instances of data as a column of data.

18. A system for implementing low overhead memory access in transpose operations, said system comprising:
a single ported memory device comprising a plurality of separately addressable memory modules which are disposed as an array of parallel columns; and
an address generator for generating a memory address based upon the location of an instance of data within a data vector stored in said memory device and wherein each successive instance of data in said data vector is shifted at least one column position and at least one row position in said memory device.

19. The system of claim 18 further comprising:
a shifting component communicatively coupled in the input data path of said memory device and wherein said address generator, in response to an indication that a row of data is being written, causes said shifting component to shift each successive instance of data being written by at least one column position based upon which row of data is being written.

20. The system of claim 19 wherein said address generator, in response to an indication that a column of data is being written, causes said shifting component to shift each successive instance of data being written by at least one column position based upon the position of said instance of data with said data vector.

21. The system of claim 19 further comprising:
a second shifting component communicatively coupled in the output data path of said memory device and wherein said address generator, in response to an indication that a row of data is being read, causes said second shifting component to shift each successive instance of data being read by at least one column position based upon which row of data is being read.

22. The system of claim 21 wherein said address generator, in response to an indication that a column of data is being written, causes said second shifting component to shift each successive instance of data being read by at least one column position based upon the position of said instance of data with said data vector.

* * * * *